United States Patent
Cao et al.

(10) Patent No.: US 11,379,664 B2
(45) Date of Patent: Jul. 5, 2022

(54) METHOD FOR ACQUIRING A PARALLEL CORPUS, ELECTRONIC DEVICE, AND STORAGE MEDIUM

(71) Applicant: Beijing Bytedance Network Technology Co., Ltd., Beijing (CN)

(72) Inventors: Jun Cao, Beijing (CN); Lei Li, Beijing (CN); Mingxuan Wang, Beijing (CN); Peihao Zhu, Beijing (CN)

(73) Assignee: Beijing Bytedance Network Technology Co., Ltd., Beijing (CN)

(*) Notice: Subject to any disclaimer, the term of this patent is extended or adjusted under 35 U.S.C. 154(b) by 0 days.

(21) Appl. No.: 17/186,702

(22) Filed: Feb. 26, 2021

(65) Prior Publication Data

US 2021/0271813 A1    Sep. 2, 2021

(30) Foreign Application Priority Data

Feb. 28, 2020    (CN) .......................... 202010130436.8

(51) Int. Cl.
*G06F 40/279*    (2020.01)
*G06F 40/263*    (2020.01)

(52) U.S. Cl.
CPC .......... *G06F 40/279* (2020.01); *G06F 40/263* (2020.01)

(58) Field of Classification Search
CPC ....... G06F 40/279; G06F 40/263; G06F 40/45
USPC ................................................. 704/8
See application file for complete search history.

(56) References Cited

U.S. PATENT DOCUMENTS

2019/0018842 A1    1/2019 Nomura et al.

FOREIGN PATENT DOCUMENTS

CN    103020043 A    4/2013
CN    104408078 A    3/2015

OTHER PUBLICATIONS

Zheng et al. (1994) "Mining Parallel Corpora from Mixed-Language Web Pages," Institute of Computing Technology, Chinese Academy of Sciences, Beijing, China, pp. 352-357.
Chinese Patent Application No. 202010130436.8, First Search Report dated Apr. 21, 2021, 2 pages with English Translation.
Chinese Patent Application No. 202010130436.8, First Office Action dated Jan. 11, 2021, 21 pages with English Translation.
Chinese Patent Application No. 202010130436.8, Second Office Action dated Apr. 8, 2021, 12 pages with English Translation.

*Primary Examiner* — Thierry L Pham

(74) *Attorney, Agent, or Firm* — Faegre Drinker Biddle & Reath LLP

(57) ABSTRACT

Provided are a method for acquiring a parallel corpus, an electronic device, and a storage medium. The method includes: acquiring text data in a target document; performing language detection on the text data; in response to the text data including at least two languages, retaining the text data; detecting a distribution proportion of words in each of the at least two languages among the retained text data; in response to each distribution proportion of words in a first language and in a second language being greater than a preset proportion threshold, retaining the detected text data; extracting sentences in the first language as a first sentence set and sentences in the second language as a second sentence set; performing sentence alignment on the first sentence set and the second sentence set; and determining sentence pairs with alignment degrees greater than a preset alignment degree threshold as the parallel corpus.

20 Claims, 7 Drawing Sheets

… (1)

METHOD FOR ACQUIRING A PARALLEL CORPUS, ELECTRONIC DEVICE, AND STORAGE MEDIUM

CROSS-REFERENCE TO RELATED APPLICATIONS

This application claims priority to Chinese patent application No. 202010130436.8 filed with the CNIPA on Feb. 28, 2020, the disclosure of which is incorporated herein by reference in its entirety.

TECHNICAL FIELD

The present disclosure relates to the technical field of computer applications, and specifically relates to a method for acquiring a parallel corpus, an electronic device, and a storage medium.

BACKGROUND

The construction of a corpus is an important foundation of statistical learning methods and has great value for the research of natural language processing. A bilingual corpus, in particular, has become an indispensable and important resource for the research of machine translation, machine-aided translation, and translation knowledge acquisition. A large number of parallel corpora are generally needed and used as training samples in order to effectively train an existing machine translation model to achieve an effect of accurate translation.

However, a large number of parallel corpora are not easy to acquire. Currently, the parallel corpora are generally generated from parallel example sentences crawled from public data sets and dictionary websites by specially developed and customized crawling and parsing extractors.

On one hand, dedicated crawling tools and parsing extractors for particular websites do not have universality and expansibility; on the other hand, the number of the above-mentioned sites is limited, so the number of parallel corpora acquired is limited, and the coverage scope of content is also limited.

SUMMARY

In view of the above, a method and apparatus for acquiring a parallel corpus, an electronic device, and a storage medium are provided in embodiments of the present disclosure to achieve automatic acquisition of a large amount of parallel corpus data from massive documents.

Other features and advantages of the embodiments of the present disclosure become apparent through the following detailed description or partly obtained through the practice of the embodiments of the present disclosure.

In an embodiment, a method for acquiring a parallel corpus is provided in the present disclosure. The method includes: acquiring text data in a target document; performing language detection on the text data; in response to the text data including at least two languages, retaining the text data; detecting a distribution proportion of words in each of the at least two languages among the retained text data; in response to each of a distribution proportion of words in a first language and a distribution proportion of words in a second language being greater than a preset proportion threshold, retaining the detected text data, where the first language and the second language have highest distribution proportions of words; extracting sentences in the first language as a first sentence set and sentences in the second language as a second sentence set from the retained detected text data; performing sentence alignment on the first sentence set and the second sentence set; and determining sentence pairs with alignment degrees greater than a preset alignment degree threshold as the parallel corpus.

In an embodiment, an apparatus for acquiring a parallel corpus is further provided in the present disclosure. The apparatus includes a text data acquisition unit, a language detection unit, a first filtering unit, a proportion detection unit, a second filtering unit, a sentence set extraction unit, an alignment unit, and a parallel corpus determination unit. The text data acquisition unit is configured to acquire text data in a target document. The language detection unit is configured to perform language detection on the text data. The first filtering unit is configured to: in response to the text data including at least two languages, retain the text data. The proportion detection unit is configured to detect a distribution proportion of words in each of the at least two languages among the retained text data. The second filtering unit is configured to: in response to each of a distribution proportion of words in a first language and a distribution proportion of words in a second language being greater than a preset proportion threshold, retain the detected text data; where the first language and the second language have highest distribution proportions of words. The sentence set extraction unit is configured to extract sentences in the first language as a first sentence set and sentences in the second language as a second sentence set from the retained detected text data. The alignment unit is configured to perform sentence alignment on the first sentence set and the second sentence set. The parallel corpus determination unit is configured to determine sentence pairs with alignment degrees greater than a preset alignment degree threshold as the parallel corpus.

In an embodiment, an electronic device is provided. The electronic device includes a processor and a memory. The memory is configured to store an executable instruction which, when executed by the processor, causes the electronic device to perform the above-mentioned method.

In an embodiment, a computer-readable storage medium is provided. The computer-readable storage medium has a computer program stored thereon, where the computer program, when executed by a processor, implements the above-mentioned method.

According to the embodiments of the present disclosure, the text data in the target document is acquired; the language detection is performed on the text data; if the text data includes at least two languages, the text data is retained; the distribution proportion of words in each language among the retained text data is detected; if each of the distribution proportion of words in the first language and the distribution proportion of words in the second language is greater than a preset proportion threshold, the detected text data is retained, where the first language and the second language have highest distribution proportions of words; the sentence alignment is performed on sentences in the first language extracted from the retained detected text data and sentences in the second language extracted from the retained detected text data; and the sentence pairs with alignment degrees greater than a preset alignment degree threshold are determined as the parallel corpus. A large amount of parallel corpus data can be automatically acquired from massive documents, and a more accurate translation model can be trained based on the acquired parallel corpus data.

BRIEF DESCRIPTION OF DRAWINGS

To illustrate technical schemes in embodiments of the present disclosure more clearly, the drawings used in the description of the embodiments of the present disclosure will be briefly described below. Apparently, the drawings described below illustrate only part of embodiments of the present disclosure. Those of ordinary skill in the art may obtain other drawings based on the embodiments of the present disclosure and the drawings described below on the premise that no creative work is done.

DETAILED DESCRIPTION

To make adopted technical schemes, and achieved effects of embodiments of the present disclosure clearer, technical schemes in the embodiments of the present disclosure will be further described in detail below in conjunction with the drawings. Apparently, the embodiments described below are part, not all, of the embodiments of the present disclosure. All other embodiments obtained by those skilled in the art based on the embodiments of the present disclosure without doing creative work fall within the scope of the present disclosure.

It is to be noted that the terms "system" and "network" are generally used interchangeably in the embodiments of the present disclosure. The term "and/or" mentioned in the embodiments of the present disclosure refers to any or all combinations of one or more relevant items listed. The terms such as "first" and "second" in the description, claims, and drawings of the present disclosure are used to distinguish between different objects and not to limit a particular order.

It is to be further noted that the embodiments of the present disclosure may be implemented separately or implemented in combination with each other, which is not limited in the embodiments of the present disclosure.

The names of messages or information exchanged between multiple apparatuses in the embodiments of the present disclosure are only for illustrative purposes and are not intended to limit the scope of such messages or information.

The technical schemes in the embodiments of the present disclosure are further described below through implementations in conjunction with the drawings.

Figure 1:
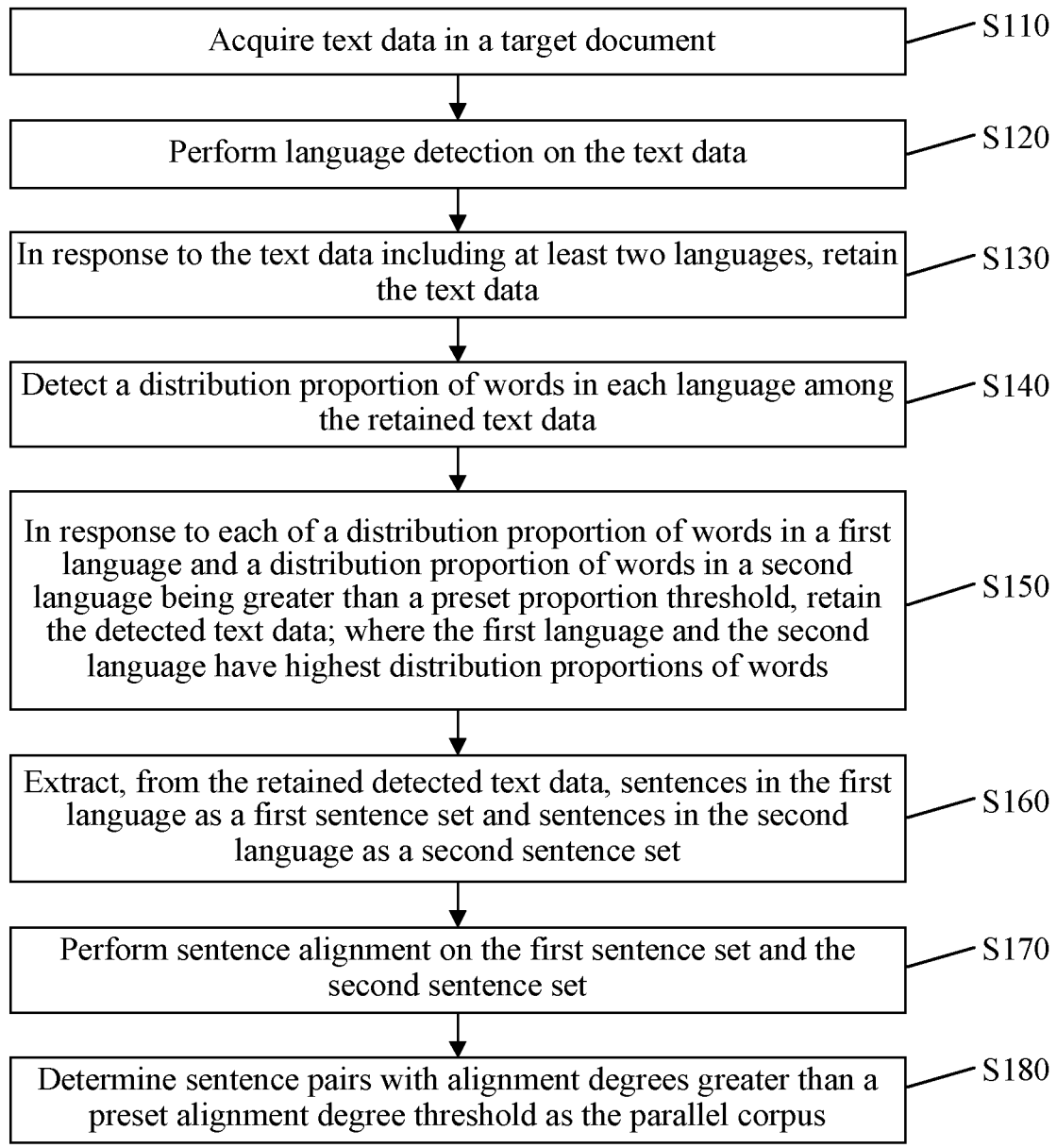
FIG. 1 is a flowchart of a method for acquiring a parallel corpus according to an embodiment of the present disclosure.

FIG. 1 shows a flowchart of a method for acquiring a parallel corpus according to an embodiment of the present disclosure. This embodiment may be applied to a situation where a document is acquired and a parallel corpus is extracted from the document. The method may be executed by an apparatus for acquiring a parallel corpus configured in an electronic device. As shown in FIG. 1, the method for acquiring a parallel corpus in this embodiment includes steps described below.

In step S110, text data in a target document is acquired. The target document includes various types of documents, for example, Hypertext Markup Language (HTML) pages acquired in a network and especially multi-language documents such as acquired dictionary-type web pages and bilingual novels, help file pages, pfg files (files of an electronic book type), and word files.

In step S120, language detection is performed on the text data. This step is used for detecting a language category involved in the text data so as to determine whether the text data is monolingual text or multilingual text.

In step S130, in response to the text data including at least two languages, the text data is retained. This step is used for finding text data belonging to the multilingual text (including at least two languages) and filtering out text data belonging to the monolingual text.

In step S140, a distribution proportion of words in each language among the retained text data is detected. What language each string in the text data belongs to may be detected and a proportion of strings in each language may be determined. Various methods may be adopted, such as statistical methods for language detection. A statistical method may be used to extract a series of language models through large-scale corpus training, and then matching is performed through a comparison of the text with eigenvalues of the trained language models.

In step S150, in response to each of a distribution proportion of words in a first language and a distribution proportion of words in a second language being greater than a preset proportion threshold, the detected text data is retained. The first language and the second language have highest distribution proportions of words. The preset proportion threshold may be a value close to 50%. Since the word lengths of text content of various languages in the parallel corpus may be different, the preset proportion threshold may be set according to the characteristics of the languages. For example, a document including at least two languages is found; and more than 40% of the document is in a first language, and more than 40% of the document is in a second language.

Through the screening in step S130 and step S150, it is easy to mine dictionary-type web pages, bilingual novels and other documents with high probability from massive network documents.

In step S160, from the retained detected text data, sentences in the first language are extracted as a first sentence set and sentences in the second language are extracted as a second sentence set. This step is used for selecting sentences in two languages with the highest proportions. If text in a third language or other languages exists, the text in the third language or other languages is filtered out.

In step S170, sentence alignment is performed on the first sentence set and the second sentence set. The sentence alignment may be performed on both the first sentence set and the second sentence set in various manners. Such manners are not limited in this embodiment.

The sentence alignment may be performed in a variety of manners. For example, the sentence alignment may be performed by using an alignment bidirectional dictionary corresponding to the two languages involved in the first sentence set and the second sentence set. The alignment bidirectional dictionary may be used for finding words in the second language according to words in the first language of the two languages and may also be used for finding words in the first language according to words in the second language of the two languages. Exemplarily, for the sentence alignment in this step, the alignment bidirectional dictionary for aligning the sentences in the first language with the sentences in the second language may be first determined and then used for performing the sentence alignment on the first sentence set and the second sentence set. For example, a comparison sentence may be taken out from the second sentence set for any source sentence in the first sentence set, and the operations described below are performed.

Word segmentation and part-of-speech filtering are performed on the source sentence to obtain a first word set, and a first alignment word set belonging to the alignment bidirectional dictionary among the first word set is determined; and the word segmentation and part-of-speech filtering are performed on the comparison sentence to obtain a second word set, and a second alignment word set belonging to the alignment bidirectional dictionary among the second word set is determined; an alignment degree between the source sentence and the comparison sentence is determined according to a number of words in the first word set, a number of words in the first alignment word set, a number of words in the second word set, and a number of words in the second alignment word set; and if the alignment degree is greater than a preset alignment degree threshold, the sentence pair formed by the source sentence and the comparison sentence is taken as a sentence pair of the parallel corpus.

In the above example, a comparison sentence may be taken out in various manners from the second sentence set for any source sentence in the first sentence set. For example, the second sentence set may be traversed to take out the comparison sentence; each sentence in the second sentence set is sequentially taken out for calculating an alignment degree with the source sentence in the first sentence set until a sentence having an alignment degree greater than the preset alignment threshold is found, and then the sentence pair is recorded in the parallel corpus. Then, a next source sentence in the first sentence set is taken out, and the above operations are repeated.

For high-quality parallel corpus mining text such as bilingual dictionaries and Chinese-English books, most of text data in both languages are aligned in parallel, for example, the first sentence in English is aligned with the first sentence in Chinese, the second sentence in English is aligned with the second sentence in Chinese, and so on. In this case, to improve an alignment speed, one sentence in the first sentence set may also be sequentially acquired as the source sentence. If the alignment degree between a previous sentence of the source sentence and an $I^{th}$ sentence in the second sentence set is greater than the preset alignment degree threshold and I is less than the number of sentences in the second sentence set, a next sentence of the $I^{th}$ sentence is taken out from the second sentence set as the comparison sentence. I is a natural number.

In step S180, sentence pairs with alignment degrees greater than a preset alignment degree threshold are determined as the parallel corpus.

Figure 2:
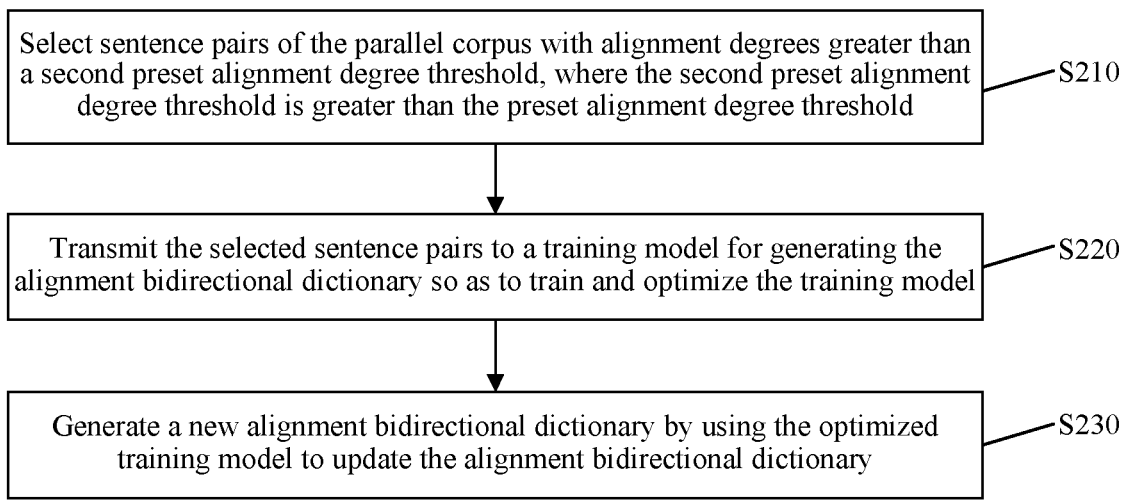
FIG. 2 is a flowchart of a method for optimizing an alignment bidirectional dictionary according to an embodiment of the present disclosure.

Further, after the sentence pairs whose alignment degrees are greater than the preset alignment degree threshold are determined as the parallel corpus, sentence pairs with better alignment degree thresholds in the obtained parallel corpora may also be used as the material to optimize the alignment bidirectional dictionary. FIG. 2 is a flowchart of a method for optimizing an alignment bidirectional dictionary according to an embodiment of the present disclosure. As shown in FIG. 2, the method for optimizing an alignment bidirectional dictionary by using sentence pairs with better alignment degree thresholds in the obtained parallel corpora includes steps described below.

In step S210, sentence pairs in the parallel corpus with alignment degrees greater than a second preset alignment degree threshold are selected, where the second preset alignment degree threshold is greater than the preset alignment degree threshold.

In step S220, the selected sentence pairs in the parallel corpus are transmitted to a training model for generating the alignment bidirectional dictionary so as to train and optimize the training model.

In step S230, a new alignment bidirectional dictionary is generated by using the optimized training model to update the alignment bidirectional dictionary.

According to this embodiment, the text data in the target document is acquired; language detection is performed on the text data; if the text data includes at least two languages, the text data is retained; a distribution proportion of words in each language among the retained text data is detected; if each distribution proportion of words respectively in the first language and the second language with the highest distribution proportions of words is greater than a preset proportion threshold, the detected text data is retained; sentence alignment is performed on sentences in the first language extracted from the retained detected text data and sentences in the second language extracted from the retained detected text data; and sentence pairs with alignment degrees greater than a preset alignment degree threshold are determined as the parallel corpus. A large amount of parallel corpus data can be automatically acquired from massive documents, and a more accurate translation model can be trained based on the acquired parallel corpus data.

Figure 3:
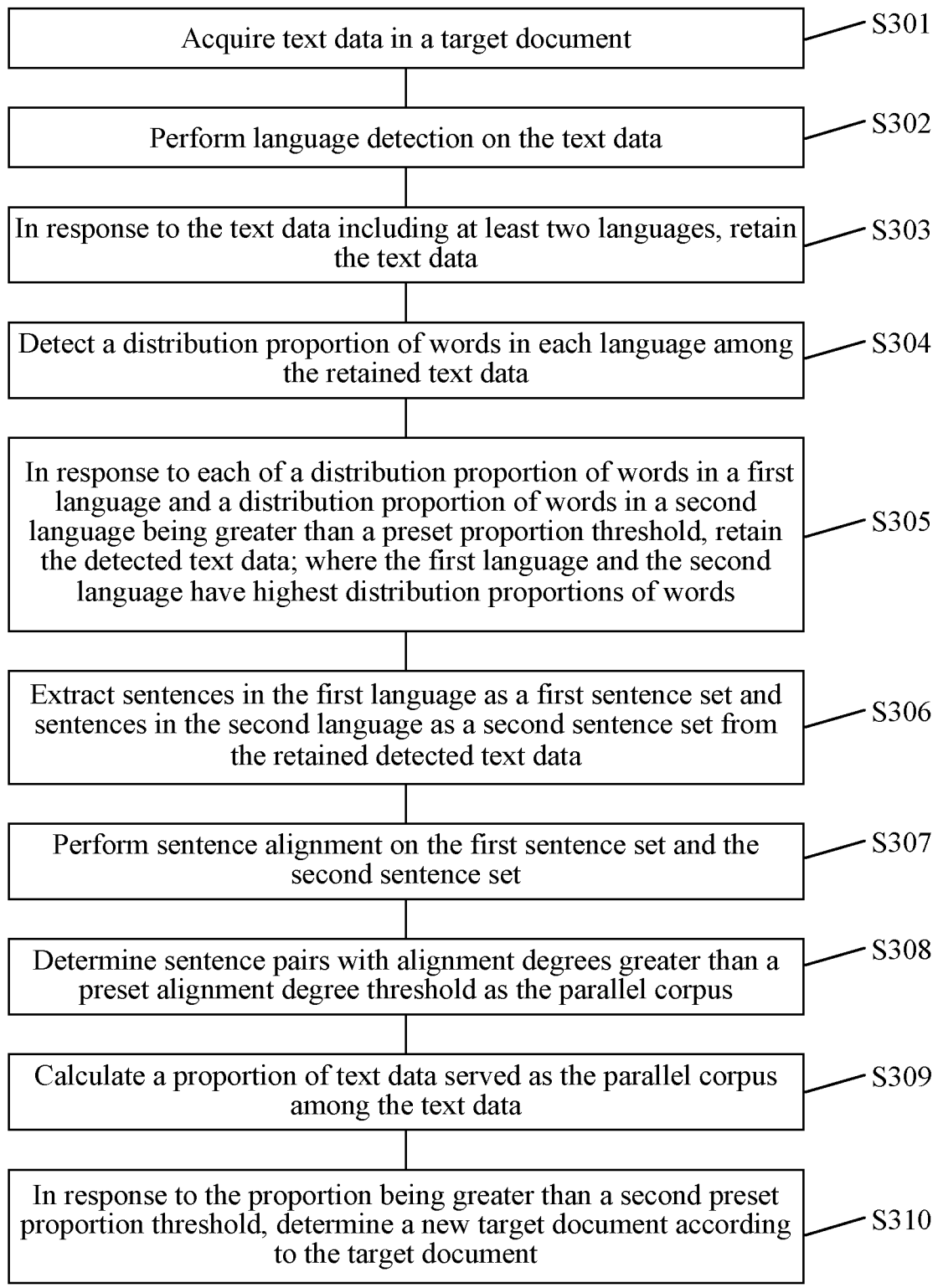
FIG. 3 is a flowchart of another method for acquiring a parallel corpus according to an embodiment of the present disclosure.

FIG. 3 shows a flowchart of another method for acquiring a parallel corpus according to an embodiment of the present disclosure. This embodiment is improved and optimized based on the preceding embodiment. As shown in FIG. 3, the method for acquiring a parallel corpus in this embodiment includes steps described below.

In step S301, text data in a target document is acquired. The target document includes various types of documents, for example, HTML pages acquired in a network and especially multi-language documents such as acquired dictionary web pages and bilingual novels, help file pages, pfg files (a file of an electronic book type), and word files.

In step S302, language detection is performed on the text data. This step is used for detecting what language each string in the text data belongs to and determining the proportion of strings in each language. Various language detection models may be used for language detection.

In step S303, in response to the text data including at least two languages, the text data is retained for finding text data belonging to multilingual text (including at least two languages) and filtering out text data belonging to monolingual text.

In step S304, a distribution proportion of words in each language among the retained text data is detected. For example, the distribution proportion of words in each language among the retained text data is detected by using a machine learning model; detection in this step may also be performed by using the language detection model in step S302 which also has such function.

In step S305, in response to each of a distribution proportion of words in a first language and a distribution proportion of words in a second language being greater than a preset proportion threshold, the detected text data is retained. The first language and the second language have highest distribution proportions of words. For example, a document including at least two languages is found; and more than 40% of the document is in a first language, and more than 40% of the document is in a second language.

In step S306, from the retained detected text data, sentences in the first language are extracted as a first sentence set and sentences in the second language are extracted as a second sentence set. This step is used for selecting sentences in two languages with the highest proportions. If text in a third language or other languages exists, the text in the third language or other languages is filtered out.

In step S307, sentence alignment is performed on the first sentence set and the second sentence set. For example, the sentence alignment may be performed by using a bidirectional dictionary for performing the sentence alignment.

In step S308, sentence pairs with alignment degrees greater than a preset alignment degree threshold are determined as the parallel corpus.

In step S309, a proportion of text data served as the parallel corpus among the text data is calculated.

In step S310, if the proportion is greater than a second preset proportion threshold, a new target document is determined according to the target document. For example, a Uniform Resource Locator (URL) address of the target document may be acquired, and a document corresponding to a URL address associated with the URL address may be obtained as a new target document, such as a web page of the same website as a current web page. For example, a document corresponding to a URL address of a sub-link in the target document may be acquired as a new target document, such as a sub-web page of a current web page.

On the basis of the preceding embodiment, this embodiment further calculates the proportion of the text data of the mined parallel corpus in the entire document after the parallel corpus in the target document is acquired, so as to mine an associated document by using the document having a relatively high proportion as a clue, and further improve the efficiency of mining a parallel corpus.

Figure 4:
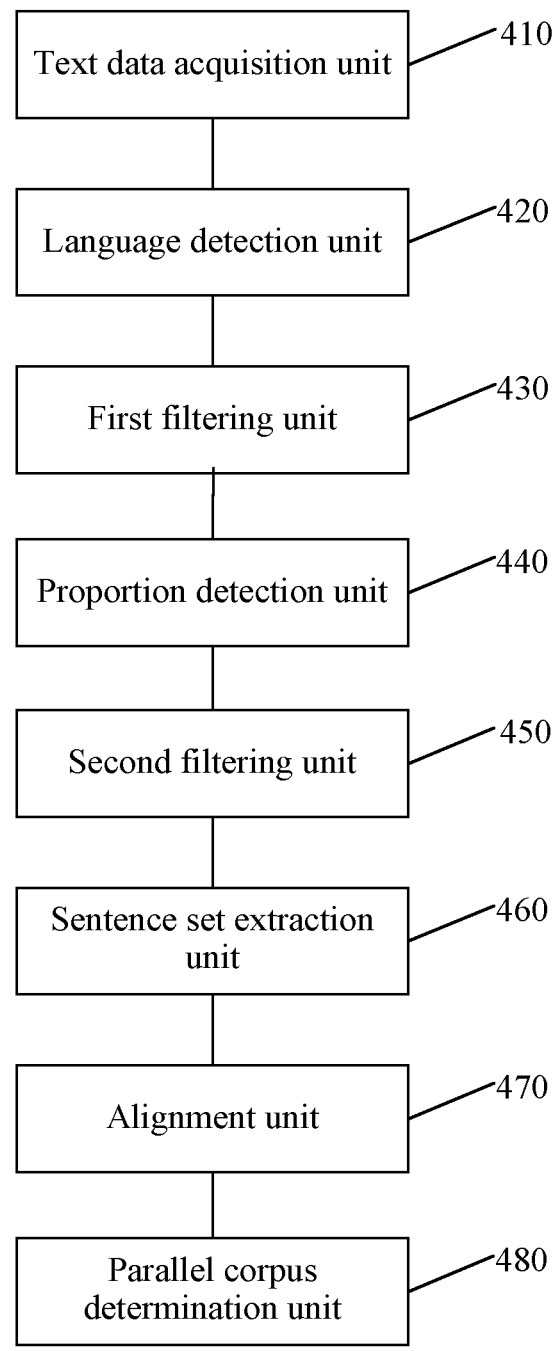
FIG. 4 is a structure diagram of an apparatus for acquiring a parallel corpus according to an embodiment of the present disclosure.

As an implementation of the method shown in each of the above figures, an apparatus for acquiring a parallel corpus is provided in an embodiment of the present application. FIG. 4 shows a structure diagram of an apparatus for acquiring a parallel corpus according to an embodiment of the present disclosure. The apparatus embodiment corresponds to the method embodiments shown in FIGS. 1 to 3. The apparatus may be applicable to various electronic devices. As shown in FIG. 4, the apparatus for acquiring a parallel corpus in this embodiment includes a text data acquisition unit 410, a language detection unit 420, a first filtering unit 430, a proportion detection unit 440, a second filtering unit 450, a sentence set extraction unit 460, an alignment unit 470, and a parallel corpus determination unit 480.

The text data acquisition unit 410 is configured to acquire text data in a target document.

The language detection unit 420 is configured to perform language detection on the text data.

The first filtering unit 430 is configured to: in response to the text data including at least two languages, retain the text data.

The proportion detection unit 440 is configured to detect a distribution proportion of words in each language among the retained text data.

The second filtering unit 450 is configured to: in response to each of a distribution proportion of words in a first language and a distribution proportion of words in a second language being greater than a preset proportion threshold, retain the detected text data; where the first language and the second language have highest distribution proportions of words.

The sentence set extraction unit 460 is configured to extract sentences in the first language as a first sentence set and sentences in the second language as a second sentence set from the retained detected text data.

The alignment unit 470 is configured to perform sentence alignment on the first sentence set and the second sentence set.

The parallel corpus determination unit 480 is configured to determine sentence pairs with alignment degrees greater than a preset alignment degree threshold as the parallel corpus.

In an embodiment, the alignment unit 470 is further configured to: determine an alignment bidirectional dictionary for aligning the sentences in the first language with the sentences in the second language; and take out a comparison sentence from the second sentence set for any source sentence in the first sentence set, and perform the following operations. Word segmentation and part-of-speech filtering are performed on the source sentence to obtain a first word set, and a first alignment word set belonging to the alignment bidirectional dictionary in the first word set is determined; and the word segmentation and part-of-speech filtering are performed on the comparison sentence to obtain a second word set, and a second alignment word set belonging to the alignment bidirectional dictionary among the second word set is determined; and an alignment degree between the source sentence and the comparison sentence is determined according to a number of words in the first word set, a number of words in the first alignment word set, a number of words in the second word set, and a number of words in the second alignment word set.

Further, the alignment unit 470 is configured to sequentially acquire one sentence in the first sentence set as the source sentence; and in response to an alignment degree between a previous sentence of the source sentence and an sentence in the second sentence set being greater than the preset alignment degree threshold and I being less than the number of sentences in the second sentence set, take out the next sentence of the sentence from the second sentence set as the comparison sentence. I is a natural number.

In an embodiment, the target document includes at least one of an HTML page in a network, a help file page, a pfg file, or a word file.

In an embodiment, the HTML page includes a bilingual novel and a dictionary-type web page acquired.

The apparatus for acquiring a parallel corpus provided by this embodiment can execute the method for acquiring a parallel corpus provided by the method embodiment of the present disclosure, and has functional modules and beneficial effects corresponding to the executed method.

Figure 5:
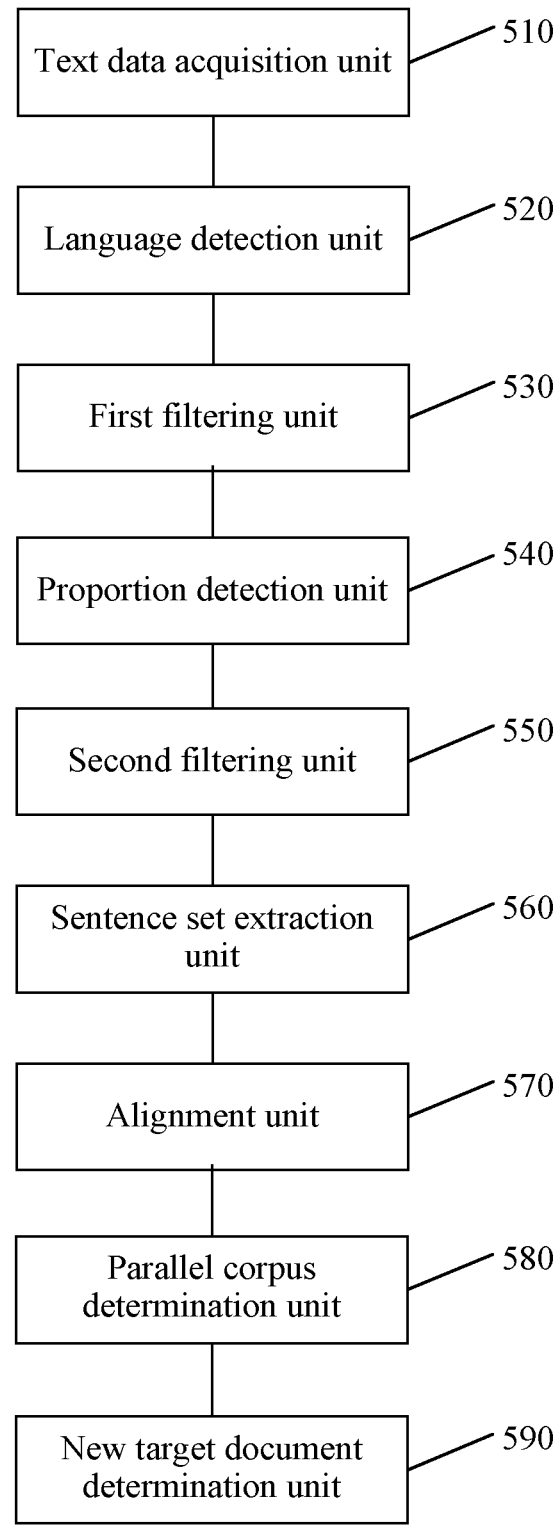
FIG. 5 is a structure diagram of another apparatus for acquiring a parallel corpus according to an embodiment of the present disclosure.

FIG. 5 shows a structure diagram of another apparatus for acquiring a parallel corpus according to an embodiment of the present disclosure. As shown in FIG. 5, the apparatus for acquiring a parallel corpus in this embodiment includes a text data acquisition unit 510, a language detection unit 520, a first filtering unit 530, a proportion detection unit 540, a second filtering unit 550, a sentence set extraction unit 560, an alignment unit 570, a parallel corpus determination unit 580, and a new target document determination unit 590.

The text data acquisition unit 510 is configured to acquire text data in a target document.

The language detection unit 520 is configured to perform language detection on the text data.

The first filtering unit 530 is configured to: in response to the text data including at least two languages, retain the text data.

The proportion detection unit 540 is configured to detect a distribution proportion of words in each language among the retained text data.

The second filtering unit 550 is configured to: in response to each of a distribution proportion of words in a first language and a distribution proportion of words in a second language being greater than a preset proportion threshold, retain the detected text data; the first language and the second language have highest distribution proportions of words.

The sentence set extraction unit 560 is configured to extract sentences in the first language as a first sentence set and sentences in the second language as a second sentence set from the retained detected text data.

The alignment unit 570 is configured to perform sentence alignment on the first sentence set and the second sentence set.

The parallel corpus determination unit 580 is configured to determine sentence pairs with alignment degrees greater than a preset alignment degree threshold as the parallel corpus.

The new target document determination unit 590 is configured to: calculate a proportion of text data served as the parallel corpus among the text data; and in response to the proportion being greater than a second preset proportion threshold, determine a new target document according to the target document.

In an embodiment, the alignment unit 570 is configured to determine an alignment bidirectional dictionary for aligning the sentences in the first language and the sentences in the second language; the alignment unit 570 is further configured to take out a comparison sentence from the second sentence set for any source sentence in the first sentence set, and perform the following operations: performing word segmentation and part-of-speech filtering on the source sentence to obtain a first word set, and determining, among the first word set, a first alignment word set belonging to the alignment bidirectional dictionary; and performing the word segmentation and part-of-speech filtering on the comparison sentence to obtain a second word set, and determining, among the second word set, a second alignment word set belonging to the alignment bidirectional dictionary; and determining an alignment degree between the source sentence and the comparison sentence according to a number of words in the first word set, a number of words in the first alignment word set, a number of words in the second word set, and a number of words in the second alignment word set.

Further, the alignment unit 570 is configured to sequentially acquire one sentence in the first sentence set as the source sentence; and in response to the alignment degree between a previous sentence of the source sentence and an $I^{th}$ sentence in the second sentence set being greater than the preset alignment degree threshold and I being less than a number of sentences in the second sentence set, take out a next sentence of the $I^{th}$ sentence from the second sentence set as the comparison sentence. I is a natural number.

In an embodiment, the new target document determination unit 590 is configured to acquire a URL address of the target document and acquire a document corresponding to a URL address associated with the URL address as the new target document.

In an embodiment, the new target document determination unit 590 is configured to acquire a URL address of a sub-link in the target document and acquire a document corresponding to a URL address associated with the URL address of the sub-link as the new target document.

In an embodiment, the target document includes at least one of an HTML page in a network, a help file page, a pfg file, or a word file.

In an embodiment, the HTML page includes a bilingual novel and a dictionary-type web page acquired.

The apparatus for acquiring a parallel corpus provided by this embodiment can execute the method for acquiring a parallel corpus provided by the method embodiment of the present disclosure, and has functional modules and beneficial effects corresponding to the executed method.

Figure 6:
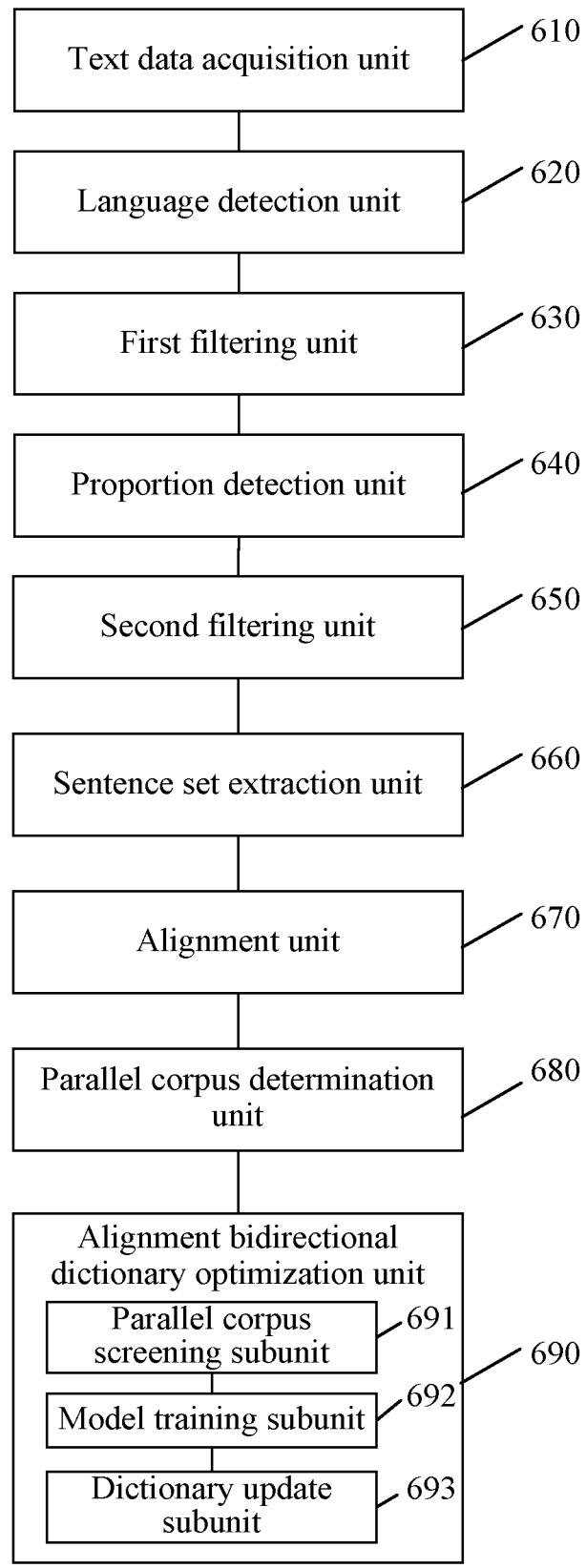
FIG. 6 is a structure diagram of another apparatus for acquiring a parallel corpus according to an embodiment of the present disclosure.

FIG. 6 shows a structure diagram of another apparatus for acquiring a parallel corpus according to an embodiment of the present disclosure. As shown in FIG. 6, the apparatus for acquiring a parallel corpus in this embodiment includes a text data acquisition unit 610, a language detection unit 620, a first filtering unit 630, a proportion detection unit 640, a second filtering unit 650, a sentence set extraction unit 660, an alignment unit 670, a parallel corpus determination unit 680, and an alignment bidirectional dictionary optimization unit 690. The alignment bidirectional dictionary optimization unit 690 includes a parallel corpus screening subunit 691, a model training subunit 692, and a dictionary update subunit 693.

The text data acquisition unit 610 is configured to acquire text data in a target document.

The language detection unit 620 is configured to perform language detection on the text data.

The first filtering unit 630 is configured to: in response to the text data including at least two languages, retain the text data.

The proportion detection unit 640 is configured to detect a distribution proportion of words in each language among the retained text data.

The second filtering unit 650 is configured to: in response to each of a distribution proportion of words in a first language and a distribution proportion of words in a second language being greater than a preset proportion threshold, retain the detected text data; the first language and the second language have highest distribution proportions of words.

The sentence set extraction unit 660 is configured to extract sentences in the first language as a first sentence set and sentences in the second language as a second sentence set from the retained detected text data.

The alignment unit 670 is configured to perform sentence alignment on the first sentence set and the second sentence set.

The parallel corpus determination unit 680 is configured to determine sentence pairs with alignment degrees greater than a preset alignment degree threshold as the parallel corpus.

The alignment bidirectional dictionary optimization unit 690 includes the parallel corpus screening subunit 691, the model training subunit 692, and the dictionary update subunit 693.

The parallel corpus screening subunit 691 is configured to: after the sentence pairs with the alignment degrees greater than the preset alignment degree threshold are determined as the parallel corpus, select sentence pairs of the parallel corpus with alignment degrees greater than a second preset alignment degree threshold. The second preset alignment degree threshold is greater than the preset alignment degree threshold.

The model training subunit 692 is configured to transmit the selected sentence pairs to a training model for generating the alignment bidirectional dictionary so as to train and optimize the training model.

The dictionary update subunit 693 is configured to generate a new alignment bidirectional dictionary by using the optimized training model to update the alignment bidirectional dictionary.

In an embodiment, the alignment unit 670 is configured to determine an alignment bidirectional dictionary for aligning the sentences in the first language and the sentences in the second language; the alignment unit 570 is further configured to take out a comparison sentence from the second sentence set for any source sentence in the first sentence set, and perform the following operations: performing word segmentation and part-of-speech filtering on the source sentence to obtain a first word set, and determining, among the first word set, a first alignment word set belonging to the alignment bidirectional dictionary; performing the word segmentation and part-of-speech filtering on the comparison sentence to obtain a second word set, and determining, among the second word set, a second alignment word set belonging to the alignment bidirectional dictionary; and determining an alignment degree between the source sentence and the comparison sentence according to a number of words in the first word set, a number of words in the first alignment word set, a number of words in the second word set, and a number of words in the second alignment word set.

Further, the alignment unit 670 is configured to sequentially acquire one sentence in the first sentence set as the source sentence; and in response to the alignment degree between a previous sentence of the source sentence and an $I^{th}$ sentence in the second sentence set being greater than the preset alignment degree threshold and I being less than the number of sentences in the second sentence set, take out a next sentence of the $I^{th}$ sentence from the second sentence set as the comparison sentence. I is a natural number.

In an embodiment, the target document includes at least one of an HTML page in a network, a help file page, a pfg file, or a word file.

In an embodiment, the HTML page includes a bilingual novel and a dictionary-type web page acquired.

The apparatus for acquiring a parallel corpus provided by this embodiment can execute the method for acquiring a parallel corpus provided by the method embodiment of the present disclosure, and has functional modules and beneficial effects corresponding to the executed method.

Figure 7:
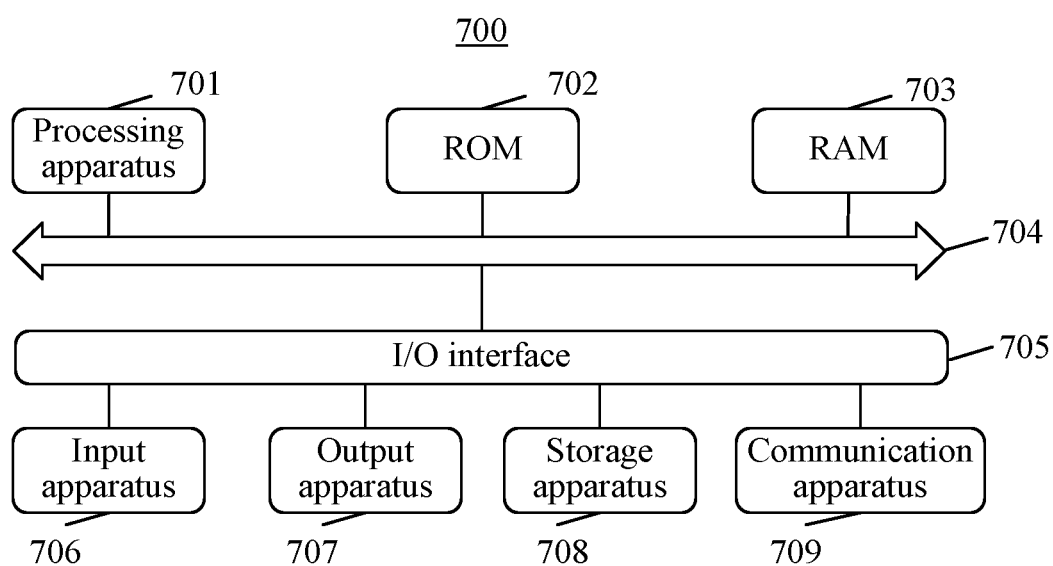
FIG. 7 shows a structure diagram of an electronic device for implementing an embodiment of the present disclosure.

FIG. 7 shows a structure diagram of an electronic device 700 for implementing an embodiment of the present disclosure. A terminal device in the embodiments of the present disclosure may include, but is not limited to, a mobile terminal such as a mobile phone, a laptop, a digital broadcast receiver, a personal digital assistant (PDA), a Pad, a portable media player (PMP), and a vehicle-mounted terminal (such as a vehicle-mounted navigation terminal) and a fixed terminal such as a digital television (TV) and a desktop computer. The electronic device shown in FIG. 7 is merely an example and is not intended to limit the function and usage scope of the embodiments of the present disclosure.

As shown in FIG. 7, the electronic device 700 may include a processing apparatus 701 (such as a central processor and a graphics processor). The processing apparatus 701 may perform various types of appropriate operations and processing based on a program stored in a read-only memory (ROM) 702 or a program loaded from a storage apparatus 708 to a random-access memory (RAM) 703. Various programs and data required for the operation of the electronic device 700 are also stored in the RAM 703. The processing apparatus 701, the ROM 702, and the RAM 703 are connected to each other through a bus 704. An input/output (I/O) interface 705 is also connected to the bus 704.

Generally, the following apparatus may be connected to the I/O interface 705: an input apparatus 706 such as a touch screen, a touch pad, a keyboard, a mouse, a camera, a microphone, an accelerometer, and a gyroscope; an output apparatus 707 such as a liquid-crystal display (LCD), a speaker, and a vibrator; the storage apparatus 708 such as a magnetic tape and a hard disk; and a communication apparatus 709. The communication apparatus 709 may allow the electronic device 700 to perform wireless or wired communication with other devices to exchange data. Although FIG. 7 shows the electronic device 700 having various apparatuses, it is to be understood that not all of the apparatuses shown herein need to be implemented or present. Alternatively, more or fewer apparatuses may be implemented or present.

Particularly, according to the embodiments of the present disclosure, the process described above with reference to the flowchart may be implemented as a computer software program. For example, the embodiments of the present disclosure include a computer program product. The computer program product includes a computer program carried on a computer-readable medium. The computer program includes program codes for performing the method shown in the flowchart. In such an embodiment, the computer program may be downloaded from a network and installed through the communication apparatus 709, or may be installed from the storage apparatus 708, or may be installed from the ROM 702. When the computer program is executed by the processing apparatus 701, the preceding functions defined in the method of the embodiments of the present disclosure are performed.

It is to be noted that the computer-readable medium described above in the embodiments of the present disclosure may be a computer-readable signal medium or a computer-readable storage medium or any combination thereof. The computer-readable storage medium, for example, may be, but is not limited to, an electrical, magnetic, optical, electromagnetic, infrared, or semiconductor system, apparatus, or device, or any combination thereof. More examples of the computer-readable storage medium may include, but are not limited to, an electrical connection with one or more wires, a portable computer magnetic disk, a hard disk, a random-access memory (RAM), a read-only memory (ROM), an erasable programmable read-only memory (EPROM), a flash memory, an optical fiber, a portable compact disc read-only memory (CD-ROM), an optical memory device, a magnetic memory device, or any appropriate combination thereof. In the embodiments of the present disclosure, the computer-readable storage medium may be any tangible medium including or storing a program. The program may be used by or in conjunction with an instruction execution system, apparatus, or device. In the embodiments of the present disclosure, the computer-readable signal medium may include a data signal propagated on a base band or as part of a carrier. Computer-readable program codes are carried in the data signal. The data signal propagated in this manner may be in multiple forms and includes, but is not limited to, an electromagnetic signal, an optical signal, or any appropriate combination thereof. The computer-readable signal medium may further be any computer-readable medium other than the computer-readable storage medium. The computer-readable signal medium may send, propagate, or transmit a program used by or in conjunction with an instruction execution system, apparatus, or device. The program codes included on the computer-readable medium may be transmitted via any appropriate medium which includes, but is not limited to, a wire, an optical cable, a radio frequency (RF), or any appropriate combination thereof.

The computer-readable medium may be included in the electronic device or may exist alone without being assembled into the electronic device.

The computer-readable medium carries one or more programs which, when executed by the electronic device, cause the electronic device to: acquire text data in a target document; perform language detection on the text data; in response to the text data including at least two languages, retain the text data; detect a distribution proportion of words in each language among the retained text data; in response to each of a distribution proportion of words in a first language and a distribution proportion of words in a second language being greater than a preset proportion threshold, retain the detected text data, where the first language and the second language have highest distribution proportions of words; extract sentences in the first language as a first sentence set and sentences in the second language as a second sentence set from the retained detected text data; perform sentence alignment on the first sentence set and the second sentence set; and determine sentence pairs with alignment degrees greater than a preset alignment degree threshold as the parallel corpus.

Computer program codes for performing the operations in the embodiments of the present disclosure may be compiled in one or more programming languages or combinations thereof. The one or more programming languages include object-oriented programming languages such as Java, Smalltalk, C++ and conventional procedural programming languages such as "C" or similar programming languages. The program codes may be executed entirely on a user computer, partly on the user computer, as a stand-alone software package, partly on the user computer and partly on a remote computer, or entirely on the remote computer or a server. In the case where the remote computer is involved, the remote computer may be connected to the user computer via any type of network including a local area network (LAN) or a wide area network (WAN) or connected to an external computer (for example, through the Internet using an Internet service provider).

The flowcharts and block diagrams among the drawings illustrate the architecture, functions, and operations of possible implementations of systems, methods, and computer program products according to various embodiments of the present disclosure. In this regard, each block in the flowcharts or block diagrams may represent one module, program segment, or part of codes. The module, program segment, or part of codes includes one or more executable instructions for implementing specified logical functions. It is also to be noted that in some alternative implementations, the functions in the blocks may occur in sequences different from those shown in the drawings. For example, two successive blocks may in fact be executed substantially at the same time or in reverse order, which depends on the functions involved. It is also to be noted that each block in the block diagrams and/or flowcharts and a combination of blocks in the block diagrams and/or flowcharts may be implemented by a specific-purpose hardware-based system which performs specified functions or operations or a combination of specific-purpose hardware and computer instructions.

The units involved in the embodiments of the present disclosure may be implemented by software or hardware. The names of the units do not constitute a limitation on the units themselves. For example, a first acquisition unit may also be described as "a unit for acquiring at least two Internet protocol addresses".

According to one or more embodiments of the present disclosure, in the method for acquiring the parallel corpus, the step of performing the sentence alignment on the first sentence set and the second sentence set includes: determining an alignment bidirectional dictionary for aligning the sentences in the first language with the sentences in the second language; and taking out a comparison sentence from the second sentence set for any source sentence in the first sentence set, and performing the following operations. Word segmentation and part-of-speech filtering are performed on the source sentence to obtain a first word set, and a first alignment word set belonging to the alignment bidirectional dictionary is determined among the first word set; and the word segmentation and part-of-speech filtering are performed on the comparison sentence to obtain a second word set, and a second alignment word set belonging to the alignment bidirectional dictionary is determined among the second word set; an alignment degree between the source sentence and the comparison sentence is determined according to the number of words in the first word set, the number of words in the first alignment word set, the number of words in the second word set, and the number of words in the second alignment word set; and if the alignment degree is greater than the preset alignment degree threshold, the sentence pair formed by the source sentence and the comparison sentence is taken as a sentence pair of the parallel corpus.

According to one or more embodiments of the present disclosure, in the method for acquiring the parallel corpus, the step of taking out the comparison sentence from the second sentence set for any source sentence in the first sentence set includes: sequentially acquiring one sentence in the first sentence set as the source sentence; and in response to an alignment degree between a previous sentence of the source sentence and an sentence in the second sentence set being greater than the preset alignment degree threshold and I being less than the number of sentences in the second sentence set, taking out a next sentence of the sentence from the second sentence set as the comparison sentence, where I is a natural number.

According to one or more embodiments of the present disclosure, the method for acquiring the parallel corpus further includes: after determining the sentence pairs with the alignment degrees greater than the preset alignment degree threshold as the parallel corpus, selecting sentence pairs of the parallel corpus with alignment degrees greater than a second preset alignment degree threshold, where the second preset alignment degree threshold is greater than the preset alignment degree threshold; transmitting the selected sentence pairs to a training model for generating the alignment bidirectional dictionary so as to train and optimize the training model; and generating a new alignment bidirectional dictionary by using the optimized training model to update the alignment bidirectional dictionary.

According to one or more embodiments of the present disclosure, the method for acquiring the parallel corpus further includes: after determining the sentence pairs with the alignment degrees greater than the preset alignment degree threshold as the parallel corpus, calculating a proportion of text data served as the parallel corpus among the text data; and in response to the proportion being greater than a second preset proportion threshold, determining a new target document according to the target document.

According to one or more embodiments of the present disclosure, in the method for acquiring the parallel corpus, the step of determining the new target document according to the target document includes: acquiring a URL address of the target document; and acquiring a document corresponding to a URL address associated with the URL address as the new target document.

According to one or more embodiments of the present disclosure, in the method for acquiring the parallel corpus, the step of determining the new target document according to the target document includes: acquiring a URL address of a sub-link in the target document; and acquiring a document corresponding to the URL address of the sub-link as the new target document.

According to one or more embodiments of the present disclosure, in the method for acquiring the parallel corpus, the target document includes at least one of an HTML page in a network, a help file page, a pfg file, or a word file.

According to one or more embodiments of the present disclosure, in the method for acquiring a parallel corpus, the HTML page includes a dictionary-type web page and a bilingual novel.

According to one or more embodiments of the present disclosure, in the apparatus for acquiring the parallel corpus, the alignment unit is configured to: determine an alignment bidirectional dictionary for aligning the sentences in the first language with the sentences in the second language; and take out a comparison sentence from the second sentence set for any source sentence in the first sentence set, and perform the following operations. Word segmentation and part-of-speech filtering are performed on the source sentence to obtain a first word set, and a first alignment word set belonging to the alignment bidirectional dictionary is determined among the first word set; the word segmentation and part-of-speech filtering are performed on the comparison sentence to obtain a second word set, and a second alignment word set belonging to the alignment bidirectional dictionary is determined among the second word set; and an alignment degree between the source sentence and the comparison sentence is determined according to the number of words in the first word set, the number of words in the first alignment word set, the number of words in the second word set, and the number of words in the second alignment word set.

According to one or more embodiments of the present disclosure, in the apparatus for acquiring the parallel corpus, the alignment unit is configured to sequentially acquire one sentence in the first sentence set as the source sentence; and in response to the alignment degree between a previous sentence of the source sentence and an $I^{th}$ sentence in the second sentence set being greater than the preset alignment degree threshold and I being less than the number of sentences in the second sentence set, take out a next sentence of the $I^{th}$ sentence from the second sentence set as the comparison sentence. I is a natural number.

According to one or more embodiments of the present disclosure, the apparatus for acquiring the parallel corpus further includes an alignment bidirectional dictionary optimization unit which includes a parallel corpus screening subunit, a model training subunit, and a dictionary update subunit. The parallel corpus screening subunit is configured to: after the sentence pairs with the alignment degrees greater than the preset alignment degree threshold are determined as the parallel corpus, select sentence pairs of the parallel corpus with alignment degrees greater than a second preset alignment degree threshold, where the second preset alignment degree threshold is greater than the preset alignment degree threshold. The model training subunit is configured to transmit the selected sentence pairs to a training model for generating the alignment bidirectional dictionary so as to train and optimize the training model. The dictionary update subunit is configured to generate a new alignment bidirectional dictionary by using the optimized training model to update the alignment bidirectional dictionary.

According to one or more embodiments of the present disclosure, the apparatus for acquiring the parallel corpus further includes a new target document determination unit which configured to: after the sentence pairs with the alignment degrees greater than the preset alignment degree threshold are determined as the parallel corpus, calculate a proportion of text data served as the parallel corpus among the text data; and in response to the proportion being greater than a second preset proportion threshold, determine a new target document according to the target document.

According to one or more embodiments of the present disclosure, in the apparatus for acquiring the parallel corpus, the new target document determination unit is configured to acquire a URL address of the target document and acquire a document corresponding to a URL address associated with the URL address as the new target document.

According to one or more embodiments of the present disclosure, in the apparatus for acquiring the parallel corpus, the new target document determination unit is configured to acquire a URL address of a sub-link in the target document and acquire a document corresponding to the URL address of the sub-link as the new target document.

According to one or more embodiments of the present disclosure, in the apparatus for acquiring the parallel corpus, the target document includes at least one of an HTML page in a network, a help file page, a pfg file, or a word file.

According to one or more embodiments of the present disclosure, in the apparatus for acquiring the parallel corpus, the HTML page includes a dictionary-type web page and a bilingual novel.

The above description is merely illustrative of preferred embodiments of the present disclosure and the technical principles used therein. Those skilled in the art should understand that the scope referred to in the embodiments of the present disclosure is not limited to the technical schemes formed by a particular combination of the technical features described above and should cover other technical schemes formed by any combination of the technical features described above or their equivalent features without departing from the concept of the present disclosure. For example, the other technical schemes may be technical schemes formed by mutual substitutions between the technical features described above and the technical features that are disclosed in the embodiments of the present disclosure and (may not necessarily) have similar functions.

What is claimed is:
1. A method for acquiring a parallel corpus, comprising:
acquiring text data in a target document;
performing language detection on the text data;
in response to the text data comprising at least two languages, retaining the text data;
detecting, in the retained text data, a distribution proportion of words in each of the at least two languages;
in response to each of a distribution proportion of words in a first language and a distribution proportion of words in a second language being greater than a preset proportion threshold, retaining the detected text data, wherein the first language and the second language have highest distribution proportions of words;

extracting, from the retained detected text data, sentences in the first language as a first sentence set and sentences in the second language as a second sentence set;

performing sentence alignment on the first sentence set and the second sentence set; and determining sentence pairs with alignment degrees greater than a preset alignment degree threshold as the parallel corpus.

2. The method of claim 1, wherein performing the sentence alignment on the first sentence set and the second sentence set comprises:

determining an alignment bidirectional dictionary for aligning the sentences in the first language with the sentences in the second language; and taking out a comparison sentence from the second sentence set for any source sentence in the first sentence set, and performing the following operations:

performing word segmentation and part-of-speech filtering on the any source sentence to obtain a first word set, and determining, among the first word set, a first alignment word set belonging to the alignment bidirectional dictionary;

performing the word segmentation and part-of-speech filtering on the comparison sentence to obtain a second word set, and determining, among the second word set, a second alignment word set belonging to the alignment bidirectional dictionary; and determining an alignment degree between the any source sentence and the comparison sentence according to a number of words in the first word set, a number of words in the first alignment word set, a number of words in the second word set, and a number of words in the second alignment word set.

3. The method of claim 2, wherein taking out the comparison sentence from the second sentence set for the any source sentence in the first sentence set comprises:

sequentially acquiring one sentence in the first sentence set as the any source sentence; and in response to an alignment degree between a previous sentence of the source sentence and an $I^{th}$ sentence in the second sentence set being greater than the preset alignment degree threshold and I being less than a number of sentences in the second sentence set, taking out a next sentence of the $I^{th}$ sentence from the second sentence set as the comparison sentence, wherein I is a natural number.

4. The method of claim 2, further comprising:

after determining the sentence pairs with the alignment degrees greater than the preset alignment degree threshold as the parallel corpus, selecting sentence pairs of the parallel corpus with alignment degrees greater than a second preset alignment degree threshold, wherein the second preset alignment degree threshold is greater than the preset alignment degree threshold;

transmitting the selected sentence pairs to a training model for generating the alignment bidirectional dictionary so as to train and optimize the training model; and generating a new alignment bidirectional dictionary by using the optimized training model to update the alignment bidirectional dictionary.

5. The method of claim 1, further comprising:

after determining the sentence pairs with the alignment degrees greater than the preset alignment degree threshold as the parallel corpus, calculating a proportion of text data served as the parallel corpus among the text data; and in response to the proportion being greater than a second preset proportion threshold, determining a new target document according to the target document.

6. The method of claim 5, wherein determining the new target document according to the target document comprises:

acquiring a Uniform Resource Locator (URL) address of the target document; and acquiring a document corresponding to a URL address associated with the URL address as the new target document.

7. The method of claim 5, wherein determining the new target document according to the target document comprises:

acquiring a URL address of a sub-link in the target document; and acquiring a document corresponding to the URL address of the sub-link as the new target document.

8. The method of claim 1, wherein the target document comprises at least one of a Hypertext Markup Language (HTML) page in a network, a help file page, a pfg file, and a word file.

9. The method of claim 8, wherein the HTML page comprises a dictionary-type web page and a bilingual novel.

10. An electronic device, comprising:

at least one processor, and a memory, which is configured to store an executable instruction which, when executed by the at least one processor, causes the electronic device to implement:

acquiring text data in a target document;

performing language detection on the text data;

in response to the text data comprising at least two languages, retaining the text data;

detecting, in the retained text data, a distribution proportion of words in each of the at least two languages;

in response to each of a distribution proportion of words in a first language and a distribution proportion of words in a second language being greater than a preset proportion threshold, retaining the detected text data, wherein the first language and the second language have highest distribution proportions of words;

extracting, from the retained detected text data, sentences in the first language as a first sentence set and sentences in the second language as a second sentence set;

performing sentence alignment on the first sentence set and the second sentence set; and determining sentence pairs with alignment degrees greater than a preset alignment degree threshold as the parallel corpus.

11. The electronic device of claim 10, wherein the executable instruction causes the electronic device to implement performing the sentence alignment on the first sentence set and the second sentence set by:

determining an alignment bidirectional dictionary for aligning the sentences in the first language with the sentences in the second language; and taking out a comparison sentence from the second sentence set for any source sentence in the first sentence set, and performing the following operations:

performing word segmentation and part-of-speech filtering on the any source sentence to obtain a first word set, and determining, among the first word set, a first alignment word set belonging to the alignment bidirectional dictionary; and performing the word segmentation and part-of-speech filtering on the comparison sentence to obtain a second word set, and determining, among the second word set, a second alignment word set belonging to the alignment bidirectional dictionary; and determining an alignment degree between the any source sentence and the comparison sentence according to a number of words in the first word set, a number of words in the first alignment word set, a number of words in the second word set, and a number of words in the second alignment word set.

12. The electronic device of claim 11, wherein the executable instruction causes the electronic device to implement taking out the comparison sentence from the second sentence set for the any source sentence in the first sentence set by:

sequentially acquiring one sentence in the first sentence set as the any source sentence; and in response to an alignment degree between a previous sentence of the source sentence and an $I^{th}$ sentence in the second sentence set being greater than the preset alignment degree threshold and I being less than a number of sentences in the second sentence set, taking out a next sentence of the $I^{th}$ sentence from the second sentence set as the comparison sentence, wherein I is a natural number.

13. The electronic device of claim 11, wherein the executable instruction causes the electronic device to further implement:

after determining the sentence pairs with the alignment degrees greater than the preset alignment degree threshold as the parallel corpus, selecting sentence pairs of the parallel corpus with alignment degrees greater than a second preset alignment degree threshold, wherein the second preset alignment degree threshold is greater than the preset alignment degree threshold;

transmitting the selected sentence pairs to a training model for generating the alignment bidirectional dictionary so as to train and optimize the training model; and generating a new alignment bidirectional dictionary by using the optimized training model to update the alignment bidirectional dictionary.

14. The electronic device of claim 10, wherein the executable instruction causes the electronic device to further implement:

after determining the sentence pairs with the alignment degrees greater than the preset alignment degree threshold as the parallel corpus, calculating a proportion of text data served as the parallel corpus among the text data; and in response to the proportion being greater than a second preset proportion threshold, determining a new target document according to the target document.

15. The electronic device of claim 14, wherein the executable instruction causes the electronic device to implement determining the new target document according to the target document by:

acquiring a Uniform Resource Locator (URL) address of the target document; and acquiring a document corresponding to a URL address associated with the URL address as the new target document.

16. The electronic device of claim 14, wherein the executable instruction causes the electronic device to implement determining the new target document according to the target document by:

acquiring a URL address of a sub-link in the target document; and acquiring a document corresponding to the URL address of the sub-link as the new target document.

17. A non-transitory computer-readable storage medium having a computer program stored thereon, wherein the computer program, when executed by a processor, implements:

acquiring text data in a target document;

performing language detection on the text data;

in response to the text data comprising at least two languages, retaining the text data;

detecting, in the retained text data, a distribution proportion of words in each of the at least two languages;

in response to each of a distribution proportion of words in a first language and a distribution proportion of words in a second language being greater than a preset proportion threshold, retaining the detected text data, wherein the first language and the second language have highest distribution proportions of words;

extracting, from the retained detected text data, sentences in the first language as a first sentence set and sentences in the second language as a second sentence set;

performing sentence alignment on the first sentence set and the second sentence set; and determining sentence pairs with alignment degrees greater than a preset alignment degree threshold as the parallel corpus.

18. The non-transitory computer-readable storage medium of claim 17, wherein the computer program implements performing the sentence alignment on the first sentence set and the second sentence set by:

determining an alignment bidirectional dictionary for aligning the sentences in the first language with the sentences in the second language; and taking out a comparison sentence from the second sentence set for any source sentence in the first sentence set, and performing the following operations:

performing word segmentation and part-of-speech filtering on the any source sentence to obtain a first word set, and determining, among the first word set, a first alignment word set belonging to the alignment bidirectional dictionary; and performing the word segmentation and part-of-speech filtering on the comparison sentence to obtain a second word set, and determining, among the second word set, a second alignment word set belonging to the alignment bidirectional dictionary; and determining an alignment degree between the any source sentence and the comparison sentence according to a number of words in the first word set, a number of words in the first alignment word set, a number of words in the second word set, and a number of words in the second alignment word set.

19. The non-transitory computer-readable storage medium of claim 18, wherein the computer program implements taking out the comparison sentence from the second sentence set for the any source sentence in the first sentence set by:

sequentially acquiring one sentence in the first sentence set as the any source sentence; and in response to an alignment degree between a previous sentence of the source sentence and an $I^{th}$ sentence in the second sentence set being greater than the preset alignment degree threshold and I being less than a number of sentences in the second sentence set, taking out a next sentence of the $I^{th}$ sentence from the second sentence set as the comparison sentence, wherein I is a natural number.

20. The non-transitory computer-readable storage medium of claim 18, wherein the computer program further implements:
after determining the sentence pairs with the alignment degrees greater than the preset alignment degree threshold as the parallel corpus, selecting sentence pairs of the parallel corpus with alignment degrees greater than a second preset alignment degree threshold, wherein the second preset alignment degree threshold is greater than the preset alignment degree threshold;
transmitting the selected sentence pairs to a training model for generating the alignment bidirectional dictionary so as to train and optimize the training model; and
generating a new alignment bidirectional dictionary by using the optimized training model to update the alignment bidirectional dictionary.

\* \* \* \* \*